Feb. 13, 1934. C. A. SCHMIDT ET AL 1,946,885
INTERNAL COMBUSTION ENGINE EXHAUST HEATER
Filed July 7, 1930 3 Sheets-Sheet 1
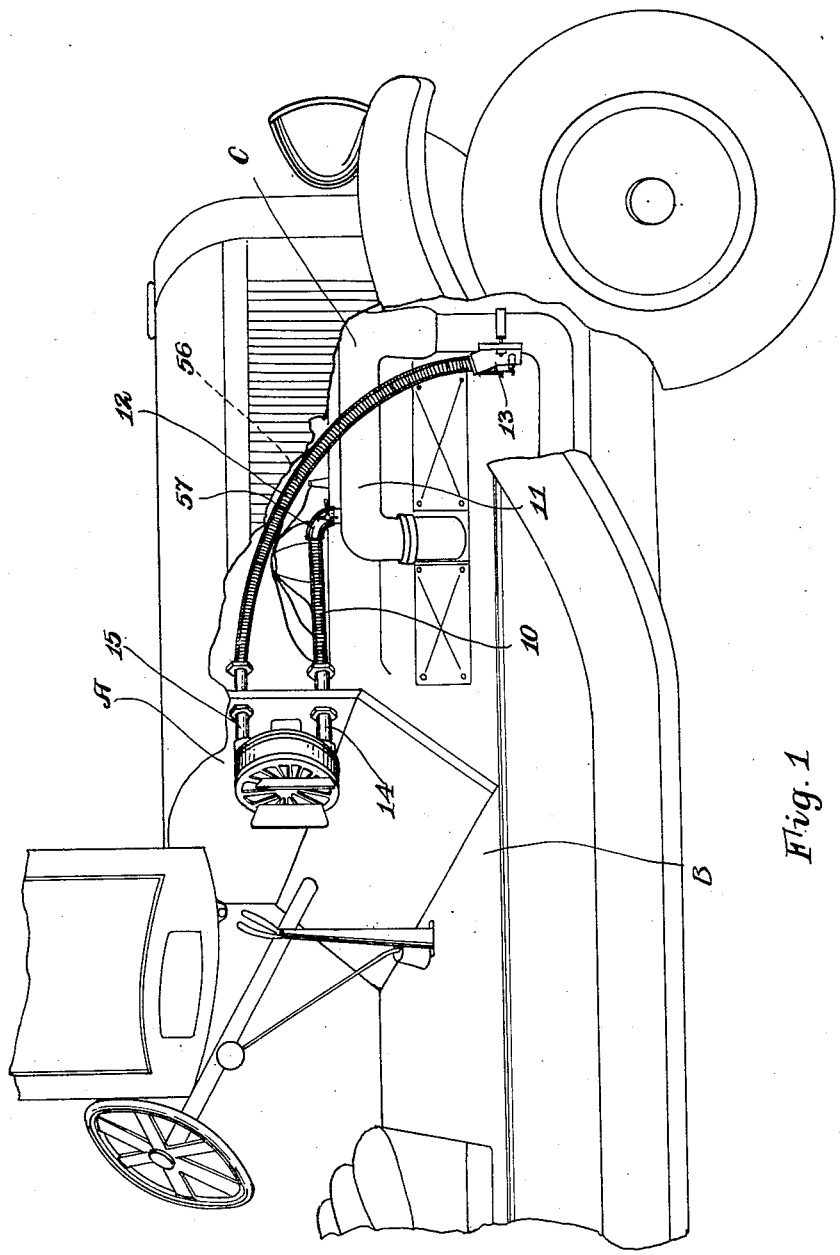
Inventor
Carl A. Schmidt
Avon B. Ashton
By Honau Riele
Attorney Feb. 13, 1934.   C. A. SCHMIDT ET AL   1,946,885
INTERNAL COMBUSTION ENGINE EXHAUST HEATER
Filed July 7, 1930   3 Sheets-Sheet 2
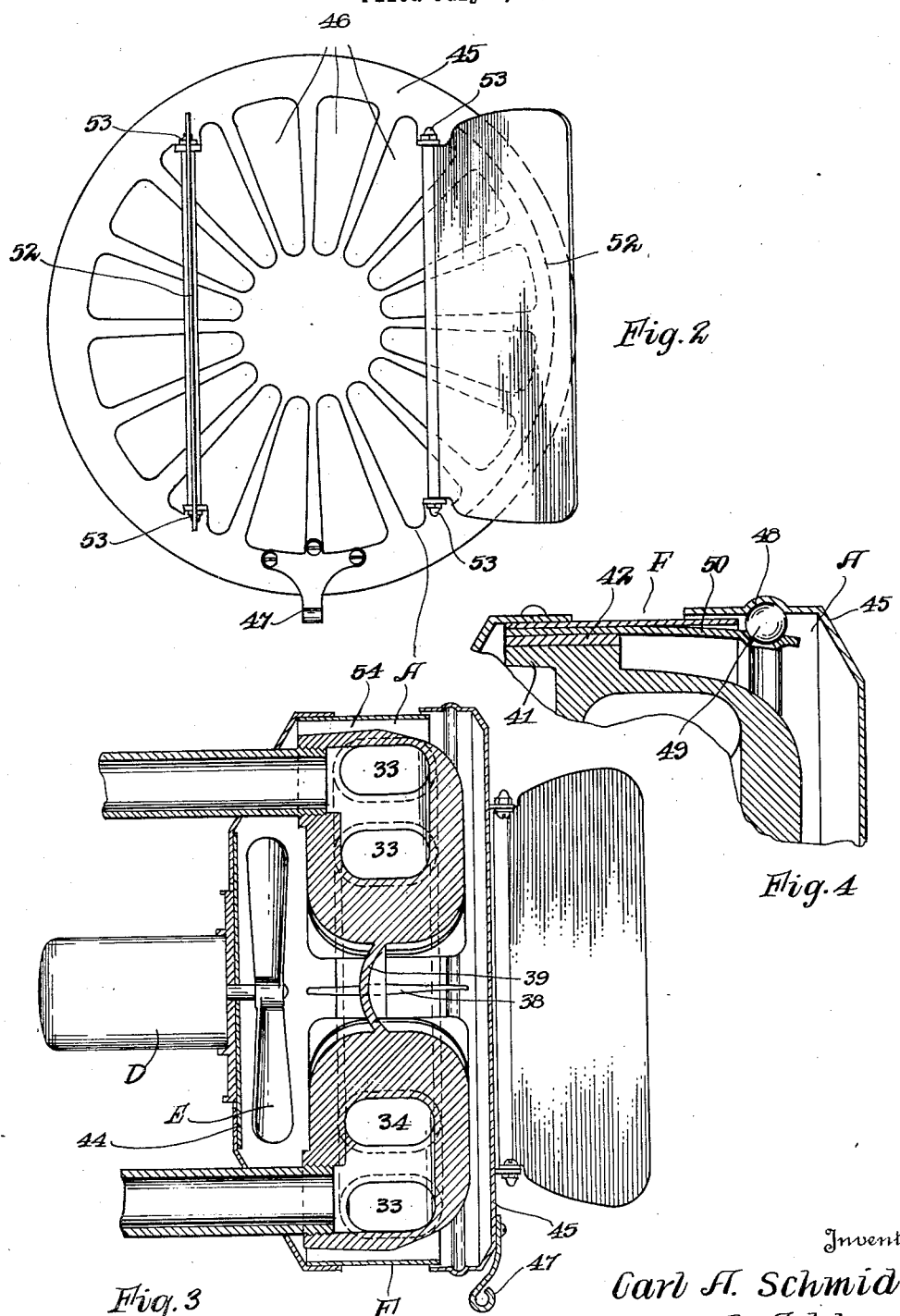
Inventor
Carl A. Schmidt
Avon B. Ashton Patented Feb. 13, 1934

1,946,885

UNITED STATES PATENT OFFICE 1,946,885

INTERNAL COMBUSTION ENGINE EXHAUST HEATER

Carl A. Schmidt and Avon B. Ashton, St. Paul, Minn., assignors to Ashco Corporation, St. Paul, Minn., a corporation of Minnesota Application July 7, 1930. Serial No. 466,182

17 Claims. (Cl. 257—137)

This invention relates to an automobile direct exhaust heater having means for providing an exhaust heater radiator within the vehicle body and which is connected with the exhaust of the internal combustion engine to carry the same into the exhaust radiator within the body of the automobile and provided with suitable valve means and flexible connections so that the radiator within the automobile will become very hot owing to the direct connection with the exhaust.

A feature of our heater resides in an exhaust heater having a peculiar formation and construction which permits the same to be operated to provide an exhaust heater within an automobile. A feature of our heater is that it becomes hot virtually instantaneously with the starting of the internal combustion engine of the automobile and by means of an electrical motor a draft of air is directed to circulate over the exhaust radiator and through the automobile to quickly heat the same. Heretofore heaters have been made operated as a water radiator with an electric means for circulating the air over the same. However, these heaters are not efficient until the liquid in the main radiator of the internal combustion engine of the automobile becomes sufficiently hot to permit heat to be transmitted to the auxiliary liquid radiator in the automobile. The result is that in certain cold climates where heat is of primary importance in an automobile, it either takes too long to heat up the automobile after it is started, or when it drives fast the cooling liquid for the engine is too cool to permit sufficient heat to be injected into the body of the automobile from the internal combustion engine to keep it warm and overcome the incoming drafts from the outside. Our heater overcomes these disadvantages owing to its nature which causes our heating radiator to become virtually instantly hot as soon as the internal combustion engine is started, and by means of the circulating fan the heat is taken off of the radiator and circulated in the automobile body. The efficiency of our heater accomplishes a result which has long been desired for motor vehicles.

A further feature of our heater for auomobiles resides in the formation of the heating radiator which is heated by the exhaust from the internal combustion engine in such a manner that the exhaust gases are received therein evenly distributed throughout the entire heating radiator and exhausted out of the radiator without retarding the exhaust in a detrimental manner and in conjunction with this providing radiating fins and baffles which cause air being circulated over the radiator to absorb heat from the same, thus providing an efficient heater for the purpose desired. In conjunction with our exhaust heating radiator we provide flexible connections and valve means which prevent any leakage of exhaust gases from entering the car.

We further provide an automobile heater which does not require any shutters or thermostat to insure efficient heating and provide a casing over our radiator spaced from the same to permit air to circulate between our radiator and the casing and prevent anyone from coming in contact with the radiator which becomes very hot so that they will not be burned on the same. This protective casing provides a means of directing the air circulation over the heater and forms the outer finishing casing of the radiator. The casing is provided with an adjustable front which carries adjustable heat directing blades and the front and heat directing blades operate as a unit to be rotated into any desired position to permit the heat directing blades to be adjusted in such a manner as to direct the heat from the radiator in a suitable manner. This permits heat to be directed from one side to the other, or in different directions within the automobile and prevents any discomfort even though one may sit directly in front of the radiator. Our adjustable unit front and shutters are mounted in a unique manner to permit the same to be easily operated and to provide a very attractive finish to the front of the radiator.

The features set forth together with other details and objects will be more fully and clearly set forth.

In the drawings forming part of this specification:

Figure 1 is a diagrammatic view showing a portion of an automobile with our direct exhaust heater in operative position.

Figure 2 is an enlarged front view of our exhaust heater showing the adjustable unit front.

Figure 3 is a side sectional view of the exhaust heater.

Figure 4 is an enlarged detail of a portion of the same.

Figure 5:
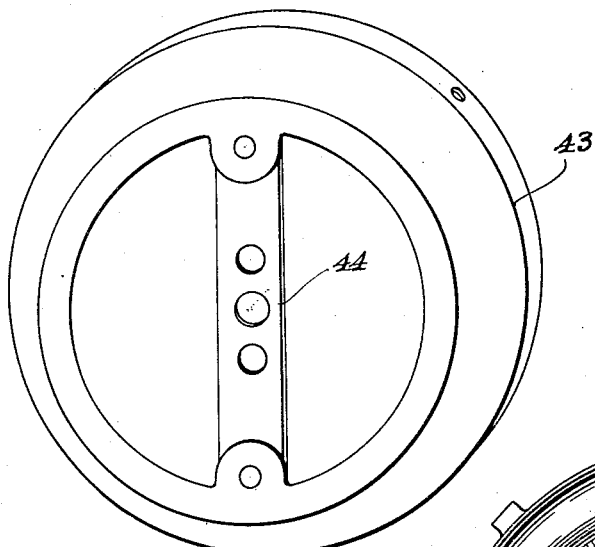
Figure 5 is a detail of the back portion of the casing.

Our heater A is positioned within the body of the automobile B in any convenient place so as to carry the heat from the internal combustion engine C when it is in operation, directly into the body of the automobile as quickly as possible after the internal combustion engine C has started to operate. In fact, our heater A operates virtually instantaneously with the operation of the internal combustion engine C and this is a very important feature in the efficiency of our heater, because it accomplishes a result very much desired and overcomes difficulties that have been experienced in providing a heater for automobiles.

Our heater A is connected by a flexible connection 10 directly to the exhaust manifold 11 so that exhaust gases may go through the flexible connection directly to the exhaust heat radiator A and from the heat radiator A they pass back through a flexible connection 12 when the valve 13 is operated to the desired position so as to direct the exhaust gases through the heat radiator A.

The radiator A is provided with an inlet pipe 14 at the bottom of the same and an exhaust pipe 15 at the top. These pipes connect respectively by gas-tight joints with the flexible connections 10 and 12 and the flow of gas through the radiator A is controlled by the valve 13. The valve 13 is provided with a casing to which the pipe 12 is connected. The valve 13 is provided with a suitable butterfly valve member not illustrated in the bearings. When the valve is in closed position across the opening in the exhaust pipe virtually all of the gas from the combustion engine C is directed to the intake pipe 10 and through the radiator A out through the pipe 12 and through the casing back into the exhaust pipe and on to the muffler of the automobile B.

Figure 6:
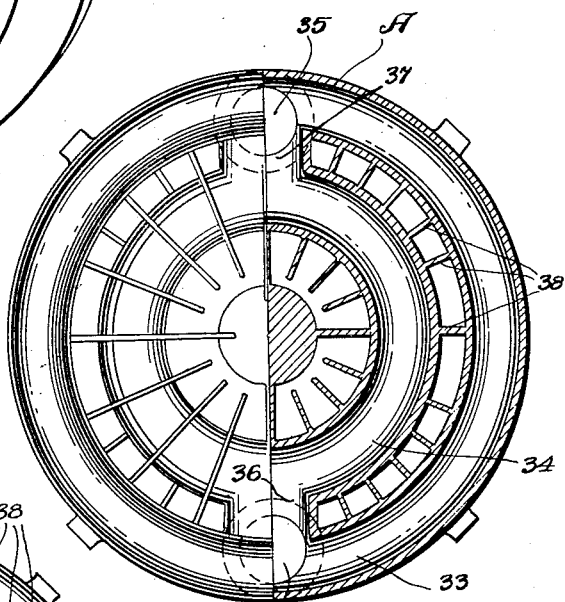
Figure 6 is a front view of the exhaust radiator, one-half of which is in cross section.
Figure 7:
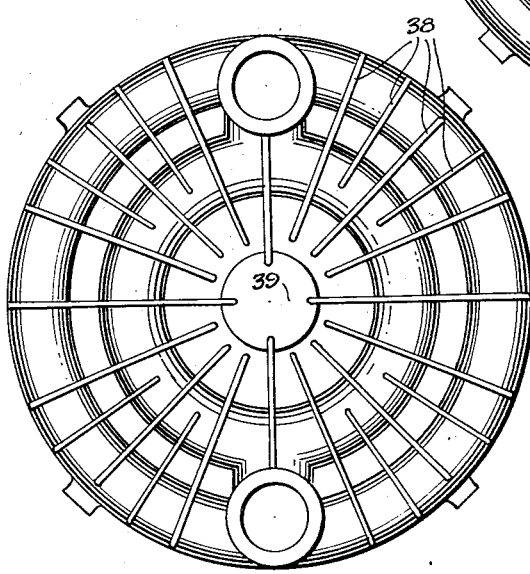
Figure 7 is a back view of the exhaust radiator.

The exhaust radiator A is of a circular nature as illustrated in Figures 6 and 7, and is provided with the intake opening 32 in the bottom which connects with the outer and inner circular passageways 33 and 34 which extend around on each side from the intake 32 and connect with the exhaust opening 35 at the top of the radiator A. The passageways 33 and 34 are of a tubular nature and are connected together by a passageway 36 at the bottom and a passageway 37 at the top. These passageways 36 and 37 are adjacent the intake opening 32 and the exhaust opening 35, respectively.

The tubular passageways 33 and 34 are connected in a single casting by the heat radiating fins 38 extending on either side of the tubular passageways 33 and 34 and some of which extend into the center and support a central baffle plate 39 at the axis 40 of the radiator A. These heat radiating fins permit the heat in the passageways 33 and 34 to be radiated out about the outer portion of the heater A and when a draft of air is caused to blow over the same it is heated very rapidly and we provide in this manner an extremely efficient automobile heater.

The heater A is of an electrical operated type for the draft of the same. The heater A is primarily an exhaust radiator adapted to receive exhaust gases so as to radiate the heat from the same into the atmosphere and to accomplish the radiation of the heat in an efficient manner we provide an electrical operation which includes the motor D having a circulating fan E which blows a draft of air over the fins 38 and causes the hot air from the radiator A to be circulated in the automobile B, in the direction of the arrows indicated in Figure 1. The motor D and the fan E are supported by the back of the casing or shroud F which encases the radiator A and which is spaced from the same by suitable bracket members 41 which are cast as a part of the radiator A and by means of an asbestos insulating gasket 42 between the casing F and the lugs 41 for supporting the same, very little heat from the radiator A is carried by the outer casing F. The back portion 43 of the casing F is provided with a diametrical bracket member 44 on which the motor D is mounted so that the fan E is within the casing F.

The front 45 of the casing F is formed in an adjustable rotatable unit formed with radial air passageways or openings 46 and an operating handle 47 on the lower side of the same. This front portion is provided with an annular groove 48 into which ball bearings 49 engage and these ball bearings are held by the spring arms 50. Several of these arms and ball bearings are provided about the groove 48 and in this manner the unit front 45 which carries the adjustable shutters 52 may be rotated as a unit by engaging the handle 47 and the shutters carried with the same to change their position in relation to the radiator heater A within the casing. The shutters 52 are pivotally connected at 53 so that they can be adjusted into the desired angular position to direct the heat from the radiator A coming out through the openings 46 into the desired direction. While the shutters 52 may be of a certain design, such as illustrated, they may also be of any other suitable design and they may project from the front 45 so as to direct the heat in only angular position away from the heat radiator A. They may also be placed in a position to close off a portion of the heater A being laid flatly across the front center portion of the heater.

The casing F is spaced by the lugs 41 from the heat radiator A, leaving an annular air passageway 54 about the radiator and thus preventing the casing F from getting hot and thereby protecting anyone from being burned on the exhaust heat radiator A which becomes virtually as hot as the exhaust manifold of the internal combustion engine C, virtually instantly with the operation of the engine.

In operation our heater A becomes instantly hot with the operation of the internal combustion engine C when the valve 13 is operated to cause the exhaust gases from the exhaust manifold 11 to pass through the heater A. However, when the valve 13 is open the gases from the exhaust manifold 11 will pass on out from the exhaust manifold 11 and out of the exhaust pipe so that the radiator A will remain cool and will have no effect in the heating of the automobile B. But when the valve 13 is operated to direct gases through the radiator A it instantly becomes hot and by a suitable operating switch, not illustrated, the motor D operates the fan E and air is circulated in the casing F over all parts of the exhaust radiator and out of the front of the casing F and into the automobile body B to provide a heater of a very efficient nature. The radiating fins 38 permit the heat to be quickly transmitted to the air which is circulated into the automobile body while the center baffle 39 spreads the air from the fan E over the center tubular passage 34.

The heater A may be shut off in the summer time from the manifold 11 by the valve 56 in the elbow 57; however, normally, the valve 56 may remain open as the valve 13 mainly controls the flow of exhaust through the heater A.

The circular formation of the heater A accomplishes a very efficient means of providing an exhaust radiator heater which does not retard the exhaust in a detrimental manner but spreads it out and permits it to pass through the circular passageways 33 and 34 freely heating the radiator A very hot and permitting the automobile body to be quickly heated up. This circular design of exhaust radiator is peculiarly efficient owing to its design in spreading the gases without retarding the same in a detrimental manner and having the nature to provide a heat radiator without dead corners or pockets, so to speak, thereby providing a means of efficiently heating an automobile virtually instantly with the starting of the internal combustion engine and permitting the heat to be controlled in direction by unit operated shutter means and providing a heater which becomes more efficient when the automobile is driven fast so as to compensate for the forced leaks and drafts into the automobile body by providing more heat, thereby accomplishing a result in a heater which is electrically operated in the draft of the air of a very desirable nature.

In accordance with the patent statutes we have described the principles of our heater and endeavored to point out the efficiency of the same together with the peculiar adaptations and design of the various parts, however, these can be applied to other uses than those set forth and obvious variations may be accomplished within the scope of the following claims without departing from the purpose and intent of the invention herein set forth.

We claim:

1. An exhaust gas radiator for automobiles including, a circular body having circular passageways formed therethrough, an intake opening and an exhaust opening in said circular body, a series of radially extending heat dispensing flanges, an axially disposed baffle extending at right angles to the plane of said flanges, and a casing surrounding said radiator and spaced therefrom to provide an air passageway thereabout through which a draft of air may be passed for heating an automobile.

2. An exhaust gas radiator for heating an automobile comprising, a pair of circular tubular body portions, intake and exhaust openings diametrically oppositely positioned in said body portion, an axial baffle plate, heat dispensing flanges projecting from said circular tubular body portion, some of which are adapted to support said axial baffle plate, and means for directing a draft of air over said radiator.

3. An automobile heating radiator through which exhaust gases from the internal combustion engine of an automobile is adapted to be passed including inner and outer circular tubular body portions through which the exhaust is adapted to travel, intake and exhaust openings connecting said tubular body portions, heat dissipating fins formed on said body portion, and a center baffle plate axially positioned in said radiator.

4. A heating radiator for an automobile including, a tubular body portion made up of a multiplicity of tubular passageways positioned one within the other, and heat dissipating fins formed on said tubular passageways to dissipate heat into air passing over said radiator.

5. A heating radiator for an automobile comprising, a unitary structure formed in a single member to provide the body of said radiator, a series of tubular exhaust gas passageways extending through said body, means for spacing said tubular passageways apart, said spacing means including connecting passageways within said tubular portion, and heat dispensing fins positioned in a manner to radiate heat from said radiator when exhaust gases pass therethrough.

6. An automobile exhaust gas radiator heater including, a body portion of a unitary structural nature, tubular exhaust passageways formed in said body portion, intake and exhaust openings positioned diametrically opposite in said tubular passageways, and a multiplicity of heat dispensing fins formed integral with said tubular passageways adapted to facilitate in the radiation of heat from said radiator.

7. A vehicle heating radiator including, a tubular body portion adapted to receive exhaust gases, radiating fins formed on said tubular radiator, a casing supported about said radiator and spaced therefrom, heat insulating means for spacing said casing from said radiator, an air circulating fan positioned within said casing to direct the air over said radiator, and a unitary shutter front adjustably positioned on said casing to direct hot air in different directions from said radiator.

8. A heater including a radiator having a unitary formation with a series of tubular passageways extending therethrough, means for connecting said radiator with a source of heat, a casing about said radiator, insulating means for spacing said casing from said radiator, an air circulating fan for directing air over and about said radiator, and a rotatable adjustable shutter front for said casing having shutter means for directing air coming out of said casing over said radiator into different directions.

9. A vehicle exhaust gas radiator including, a circular tubular radiator, exhaust passageways formed through said radiator, radial heat dispensing fins connecting said tubular passageways, and a casing for protecting said radiator spaced therefrom to permit a draft of air to pass over said radiator.

10. An exhaust gas radiator for automobiles, a tubular radiator, heat dispensing fins projecting from said radiator, a casing for inclosing said radiator, an air circulating fan contained within said casing, a unitary shutter front adjustably positioned on said casing, ball bearings for supporting said front, and spring means for holding said ball bearings in a manner to provide frictional contact to hold said unitary shutter front in adjusted position.

11. An automobile exhaust gas heater including, a tubular casting having a series of exhaust passageways extending therethrough, intake and outlet passageways, a casing for surrounding said radiator, heat insulating means for spacing said casing from said radiator, an air circulating fan positioned in said casing, a rotatable shutter front on said casing, ball bearing spring means for supporting said rotatable front in adjusted position.

12. A vehicle exhaust gas radiator including, a radiator body having a series of tubular passageways extending therethrough, heat dispensing fins projecting from said passageways, baffle means in the center of said radiator to baffle the air being blown over said radiator and spread the same toward the outside thereof, said radiator having a unitary structure, and the tubular passageways being formed in a manner to permit exhaust gases to pass freely through said radiator.

13. A radiator adapted to receive exhaust gases through the same including, a tubular body portion made up of a series of annularly shaped tubes placed one within the other, each tube being spaced from the other but with a common axis lying in a common transverse plane, and each entirely outside of the other, and a series of radial heat dispensing fins connecting together said tubular passageways, adapted to be heated by exhaust gases passing through said passageways.

14. An exhaust gas radiator including a circular body portion, said body portion including a series of tubular members one entirely outside of the other having tubular exhaust passageways therethrough, intake and exhaust openings connecting said passageways, radially disposed heat dispensing fins formed connecting together said tubular members of said body, and an axially disposed air baffle.

15. An exhaust gas radiator including, tubular gas passageways formed in said radiator, heat dispensing fins formed on said radiator, intake and exhaust openings formed in said radiator, a central opening through said radiator, an air baffle formed in the center of said radiator within said opening, a casing about said radiator, an adjustable shutter front for said radiator carried by said casing, and an air circulating fan means disposed within said casing to circulate air over said radiator.

16. A vehicle radiator including, a hollow body portion, inlet and outlet fluid passages thereto, a rotatable adjustable front supported in front of, and rotatable with respect to said body portion, and shutters pivotally connected to said front.

17. A vehicle radiator including, circular exhaust gas passages forming a body portion, inlet and outlet passages thereto, and a series of radially extending heat dispensing flanges extending between and connecting said exhaust gas passages on said body portion.

CARL A. SCHMIDT.
A. B. ASHTON.